E. EINFELDT.
TRACTION WHEEL.
APPLICATION FILED MAR. 24, 1917.
1,295,017.
Patented Feb. 18, 1919.
2 SHEETS—SHEET 1.
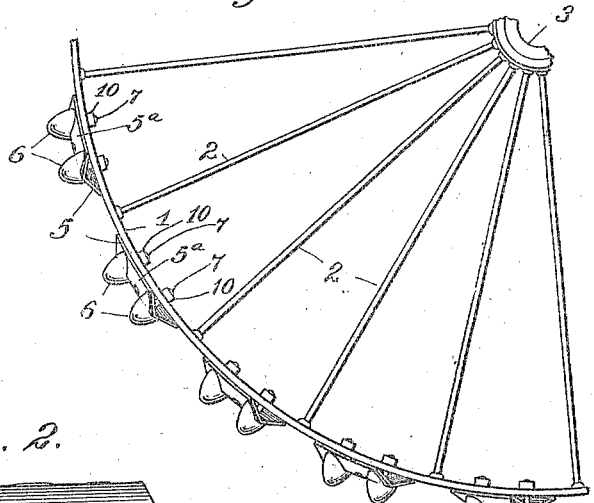
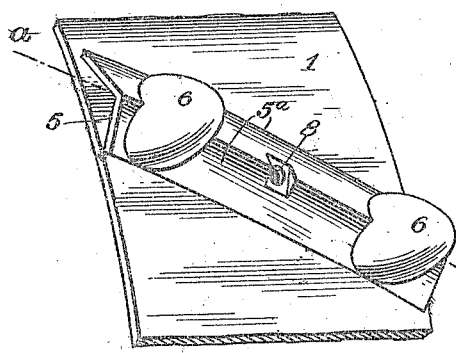
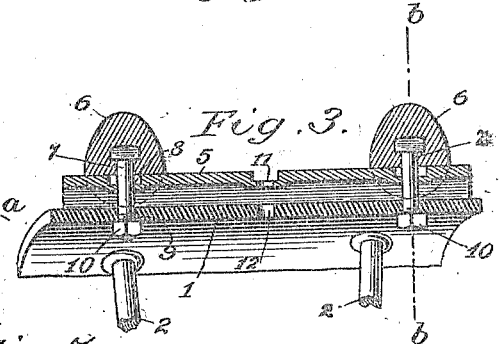
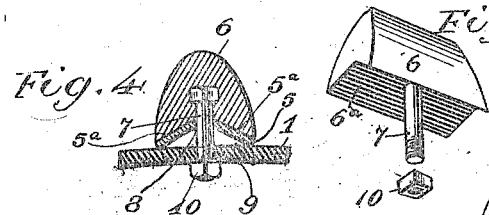
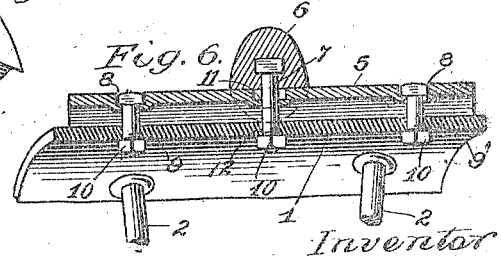
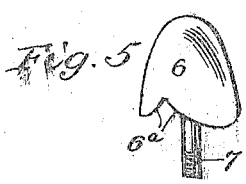
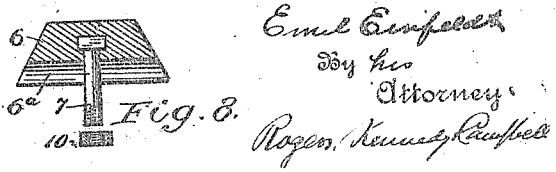
Inventor
Emil Einfeldt
By his Attorney
Rogers, Kennedy Campbell

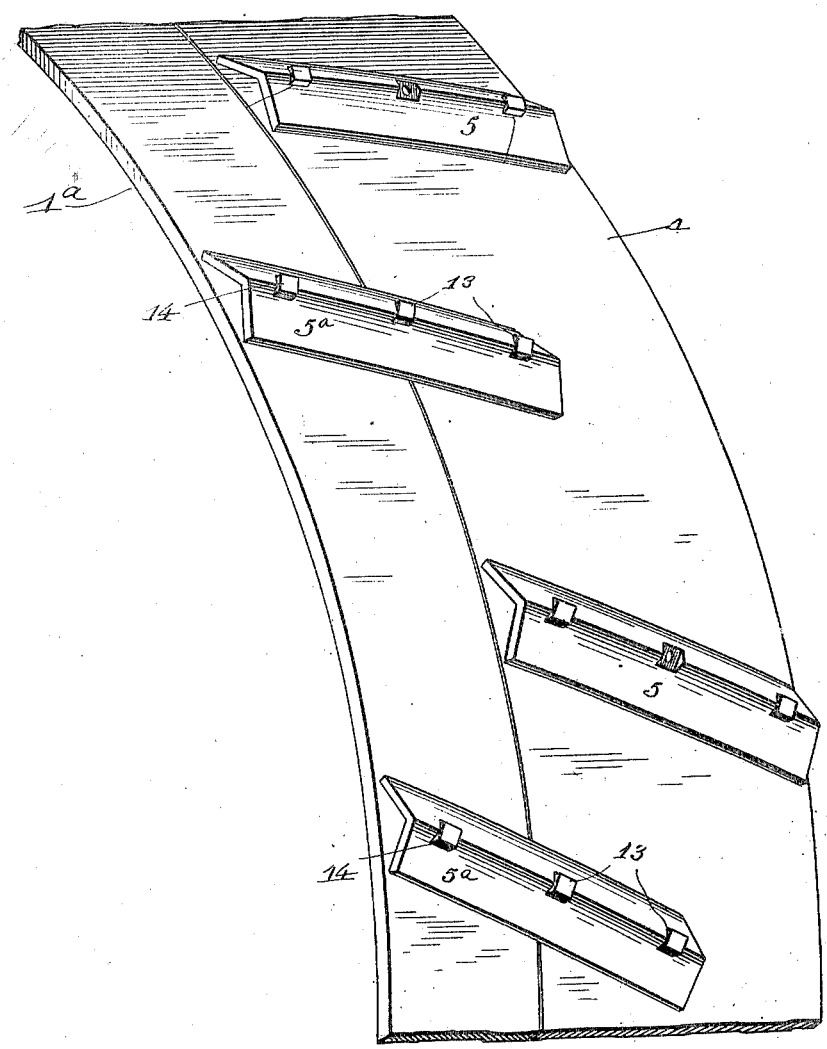

UNITED STATES PATENT OFFICE.

EMIL EINFELDT, OF DAVENPORT, IOWA, ASSIGNOR TO G. WATSON FRENCH, NATHANIEL FRENCH, JOSEPH L. HECHT, AND W. H. STACKHOUSE, ALL OF DAVENPORT, IOWA, COMPOSING THE FIRM OF FRENCH & HECHT, OF DAVENPORT, IOWA.

TRACTION-WHEEL.

1,295,017.   Specification of Letters Patent.   Patented Feb. 18, 1919.

Application filed March 24, 1917. Serial No. 157,086.

*To all whom it may concern:*

Be it known that I, EMIL EINFELDT, formerly a subject of the Emperor of Germany, but having taken out my first papers for United States citizenship, residing at Davenport, in the county of Scott and State of Iowa, have invented certain new and useful Improvements in Traction-Wheels, of which the following is a specification, reference being had therein to the accompanying drawing.

This invention relates to traction wheels and has reference more particularly to that type of wheel in which the rim is provided with traction elements of two forms, one in the form of traction cleats extending transversely of the rim and the other in the form of traction lugs or points located between the cleats. This arrangement requires that the traction lugs or points be of comparatively great height in proportion to the area of their bases, and consequently great difficulty is encountered in securing the lugs so firmly in place on the wheel rim as will withstand the severe strains encountered in use. These difficulties are more pronounced in cases where a rim of light material is employed, since, by reason of the limited bearing afforded by the bases of the lugs, there is danger of the lugs tearing through and rupturing the metal.

My invention aims to overcome these difficulties and it consists in utilizing the transverse cleats as a base or supporting means for the lugs, by fastening the lugs to the tops of the cleats. As a result of this arrangement, the height of the cleats is added to that of the lugs, and consequently the latter may be of less height than heretofore, with consequently increased cross sectional supporting area in proportion to the height; and further in the case of rims of thin metal, the increased area of support for the lugs afforded by the cleats will prevent the lugs from tearing through or rupturing the metal.

In the accompanying drawings:

Figure 1 is a side elevation of a portion of a wheel having my invention embodied therein.

Fig. 2 is a perspective face view, on an enlarged scale, of a portion of the rim of the wheel, showing the same equipped with traction cleats and lugs in accordance with my invention.

Fig. 3 is a sectional elevation on the line $a-a$ of Fig. 2.

Fig. 4 is a cross section on the line $b-b$ of Fig. 3.

Fig. 5 is a perspective view of one of the traction lugs removed.

Fig. 6 is a view similar to Fig. 3 with the parts differently arranged.

Fig. 7 is a perspective view of a traction lug in slightly modified form.

Fig. 8 is a cross sectional view of the same.

Fig. 9 is a perspective view of a portion of a wheel rim and an extension rim with the traction cleats applied to hold the extension rim in operative relation to the main rim.

Referring to the drawings:

Referring particularly to Figs. 1 to 5, 1 designates a portion of a wheel rim connected by spokes 2 to a hub 3. In accordance with my invention the rim has applied thereto at intervals, traction cleats 5, and traction lugs 6 fastened to and supported by the cleats. The cleats are preferably angular or V-shaped in cross section and are fixed to the rim with their apices facing outwardly, thereby presenting ribs or ridges with sloping sides 5ª, which ridges project outwardly from the face of the rim and are disposed transverse thereof so as to act with a tractive effect. The traction lugs 6 are in the present instance in the form of cone shaped blocks which are recessed in their bases as at 6ª to receive the sloping sides of the cleats and be supported thereby. The lugs are fastened in place on the cleats and the latter fastened to the rim, by means of stems 7 projecting axially from the lugs and extending through holes 8 in the cleats and through holes 9 in the rim, nuts 10 being applied to the inner ends of the stems and bearing against the inner face of the rim, and thus holding the parts fixedly and firmly in operative relations.

From the construction described it will be observed that the lugs rest on and receive their support from the cleats, and being supported thereby at an elevation from the face of the rim, the lugs are given effective height to produce the desired tractive effect without making them unduly long or slender. As a result they will possess an extended supporting area at their bases sufficient to give firm and rigid support without liability of bending or displacement. It will be further observed that in the event of a rim of light metal being employed, the extended support afforded to the lugs by the cleats, will distribute the strains received by the lugs to the rim, and will thereby prevent the lugs from tearing through or rupturing the rim as would be apt to occur if the lugs were fastened directly to the light rim.

Two lugs may be applied to the cleats—one at each end as shown in Fig. 3, or a single lug may be applied to the center of the cleat as shown in Fig. 6, the cleat and rim being provided with central holes 11 and 12 for this purpose; or the lugs may be otherwise arranged on the cleats, and those on one cleat may be differently arranged relatively to those on the other cleats according to the nature of the ground and the character of the work for which the wheel is used.

The lugs may be of an elongated form as shown in Fig. 8, or of other forms, and the cleats may be disposed axially of the wheel rim or angularly thereof as shown in Fig. 2, or in other views, the angular arrangement being preferable as it will better keep the wheel clean and prevent the accumulation of dirt, trash, etc.

For certain purposes it is desirable to employ in connection with the rim of the wheel, an extension rim to form an axial continuation of the main rim and thereby increase the width of the tread surface, and in order to fasten the extension rim in firm operative relation to the main rim, I propose to adopt the construction shown in Fig. 9, wherein it will be seen that the extension rim 1ª is fastened to the main rim by the traction cleats 5ª arranged between the cleats 5 and extending laterally of the main rim so as to overlap and extend across the supplemental rim. The cleats 5ª are secured to the main rim by the fastening bolts 13 and are secured to the supplemental rim by the fastening bolts 14. This construction not only effects the connection of the extension rim to the main rim but also provides traction elements on the supplemental rim.

In the foregoing description and accompanying drawings I have disclosed my invention in the particular form and construction which I prefer to adopt, but it will be manifest that the details may be variously changed and modified within the skill of the mechanic, without departing from the limits of my invention; and further it will be understood that the invention is not limited to any particular form or arrangement of the parts except in so far as such limitations are specified in the claim.

Having thus described my invention, what I claim is:

In a wheel and in combination with the rim, a traction element therefor comprising a V-shaped supporting member applied to the rim with its apex outward and a traction lug recessed to receive the apex of the supporting member and supported thereby.

In testimony whereof, I have affixed my signature in presence of two witnesses.

EMIL EINFELDT.

Witnesses:
ANDREW NEILSON,
S. L. SAMPLE.